(12) United States Patent
Kroeger et al.

(10) Patent No.: US 12,284,929 B2
(45) Date of Patent: Apr. 29, 2025

(54) FARM IMPLEMENT TRACTOR MOUNTING SYSTEM

(71) Applicants: Benjamin D. Kroeger, Syracuse, MO (US); Michael W. Kroeger, LaMonte, MO (US)

(72) Inventors: Benjamin D. Kroeger, Syracuse, MO (US); Michael W. Kroeger, LaMonte, MO (US)

( * ) Notice: Subject to any disclaimer, the term of this patent is extended or adjusted under 35 U.S.C. 154(b) by 708 days.

(21) Appl. No.: 17/199,378

(22) Filed: Mar. 11, 2021

(65) Prior Publication Data

US 2021/0282308 A1 Sep. 16, 2021

Related U.S. Application Data

(60) Provisional application No. 62/988,067, filed on Mar. 11, 2020.

(51) Int. Cl.
*A01B 59/06* (2006.01)

(52) U.S. Cl.
CPC .......... *A01B 59/064* (2013.01); *A01B 59/062* (2013.01)

(58) Field of Classification Search
CPC ... A01B 59/062; A01B 59/064; A01B 59/048; A01B 59/06; A01B 59/066; A01B 59/068; A01B 59/002; A01B 71/06; B62D 49/065; E02F 3/3627; E02F 3/627; E01H 5/06
See application file for complete search history.

(56) References Cited

U.S. PATENT DOCUMENTS

| | | | | | |
|---|---|---|---|---|---|
| 3,285,625 | A | * | 11/1966 | Krueger | B62D 49/065 37/231 |
| 3,760,883 | A | * | 9/1973 | Birk | A01B 59/062 37/231 |
| 4,717,166 | A | * | 1/1988 | Vachon | E01H 5/06 280/495 |
| 4,929,143 | A | * | 5/1990 | Dohnalik | B66F 9/0655 414/723 |
| 5,040,615 | A | * | 8/1991 | Fletcher | A01B 59/062 172/47 |

(Continued)

*Primary Examiner* — Adam J Behrens
*Assistant Examiner* — Blake E Scoville

(57) ABSTRACT

A mounting system for mounting a farm implement to a tractor having a bracket attached to the front of the tractor, the bracket having a forwardly extending portion and an upwardly extending protrusion. The mounting system comprises a farm implement attachment member comprising one or more arms with a connection mechanism adapted to connect to a farm implement; a height adjusting mechanism adapted to adjust the height of the farm implement when connected to the one or more arms of the farm implement attachment member; and a tractor connection mechanism adapted to latch onto a bracket on the front of a tractor, wherein the tractor connection mechanism comprises a connection plate, a top hook extending rearwardly from the connection plate, and a bracket engagement member extending rearwardly from the connection plate, wherein the top hook is configured to hook onto the upwardly extending protrusion of the bracket and wherein the bracket engagement member is configured to engage a bottom of the bracket.

16 Claims, 4 Drawing Sheets

(56) References Cited

U.S. PATENT DOCUMENTS

| | | | | |
|---|---|---|---|---|
| 5,098,252 | A | * | 3/1992 | Sheesley ............... E02F 3/3686 403/324 |
| 5,568,694 | A | * | 10/1996 | Capra ....................... E01H 5/06 37/231 |
| 6,499,934 | B1 | * | 12/2002 | Kaczmarski .......... E02F 3/3668 37/468 |
| 6,526,677 | B1 | * | 3/2003 | Bloxdorf ................. E01H 5/066 37/231 |
| 7,334,357 | B1 | * | 2/2008 | Altheide ................... E01H 5/06 37/231 |
| 7,575,077 | B2 | * | 8/2009 | Priepke ................ A01B 71/063 180/53.3 |
| 7,658,235 | B2 | * | 2/2010 | Dahl .................... A01B 59/068 172/449 |
| 8,046,938 | B1 | * | 11/2011 | Jorgenson ............... E02F 3/627 37/231 |
| 8,555,995 | B2 | * | 10/2013 | Harris .................. A01B 59/064 172/810 |
| 8,672,048 | B2 | * | 3/2014 | Crumpler, Jr. ....... A01B 59/048 172/611 |
| 2012/0138321 | A1 | * | 6/2012 | Harris .................. A01B 59/064 172/810 |
| 2013/0069385 | A1 | * | 3/2013 | Cunagin ................ B62D 21/12 296/1.07 |
| 2014/0027137 | A1 | * | 1/2014 | Crumpler, Jr. ....... A01B 59/048 172/776 |

\* cited by examiner

FARM IMPLEMENT TRACTOR MOUNTING SYSTEM

PRIORITY

The present application claims the benefit of domestic priority based on U.S. Provisional Patent Application 62/988,067 filed on Mar. 11, 2020. the entirety of both of which are incorporated herein by reference.

BACKGROUND

A common part of a commercial farming operation is the mounting of a farm implement to the front of a tractor.

One example of a farm implement that can be mounted onto the front of a tractor is a weed electrocution device. Weed electrocution devices deliver a lethal dose of current to unwanted vegetation to kill in the unwanted vegetation in a manner that avoids or reduces the amount of pesticides used. In the agricultural industry, there is increasing pressures to reduce the amount of herbicides, pesticides, and other toxic products applied to crops. This need is especially increasing with the push for more organically grown crops that do not use traditional herbicides and pesticides to treat the crops. By reducing the amount of toxic chemicals applied to crops there is less runoff of these chemicals to harm humans and other animal life.

One problem with weed electrocution systems that are mounted to tractors is that the height of the weed electrocution system can be difficult to adjust. If the height is not properly set and/or easily adjustable, the weed electrocution system may nor effectively contact unwanted vegetation and/or may contact wanted vegetation. Similarly, the height of other tractor-mounted implements may also have the need for height and/or angular adjustment. A device known as a three point hitch or linkage may be used to attach the implement. However, attaching the three point hitch to the tractor has its own difficulties. For example, the process is time consuming and not universal. Furthermore, other features that are present on a tractor, such as a weight bracket or the like, need to be removed when a three point hitch is attached to the front of the tractor.

Therefore, there exists a need for an improved system for mounting a farm implement to the front of a tractor. There is further a need for mounting a farm implement to the front of a tractor in a manner where the height of the system can be adjusted. There is further a need for mounting a farm implement to the front of a tractor in a manner where the angle of the system can be adjusted. There is further a need for mounting a system to the front of a tractor in a manner where the height and angle of the system can be adjusted. There is a further need for mounting a farm implement to the front of a tractor in a convenient manner.

SUMMARY

The present invention satisfies these needs. In one aspect of the invention, an improved front tractor mounting system is provided.

In another aspect of the invention, a front tractor mounting system is mountable to the front of a tractor in an easy and convenient manner.

In another aspect of the invention, a front tractor mounting system is mountable to the front of a tractor using a bracket associated with the front of the tractor.

In another aspect of the invention, a front tractor mounting system is mountable to the front of a tractor using a weight bracket associated with the front of the tractor.

In another aspect of the invention, a front tractor mounting system includes a connection system that connects a height adjustment mechanism to a bracket associated with the front of a tractor.

In another aspect of the invention, a front tractor mounting system includes a connection system that connects a height adjustment mechanism to a bracket associated with the front of a tractor.

In another aspect of the invention, a mounting system for mounting a farm implement to a tractor having a bracket attached to the front of the tractor, the bracket having a forwardly extending portion and an upwardly extending protrusion, the mounting system comprises a farm implement attachment member comprising one or more arms with a connection mechanism adapted to connect to a farm implement; a height adjusting mechanism adapted to adjust the height of the farm implement when connected to the one or more arms of the farm implement attachment member; and a tractor connection mechanism adapted to latch onto a bracket on the front of a tractor, wherein the tractor connection mechanism comprises a connection plate, a top hook extending rearwardly from the connection plate, and a bracket engagement member extending rearwardly from the connection plate, wherein the top hook is configured to hook onto the upwardly extending protrusion of the bracket and wherein the bracket engagement member is configured to engage a bottom of the bracket.

In another aspect of the invention, a mounting system for mounting a farm implement to a tractor having a bracket attached to the front of the tractor, the bracket having a forwardly extending portion and an upwardly extending protrusion, the mounting system comprises a farm implement attachment member comprising one or more arms with a connection mechanism adapted to connect to a farm implement; a height adjusting mechanism adapted to adjust the height of the farm implement when connected to the one or more arms of the farm implement attachment member; and a tractor connection mechanism adapted to latch onto a bracket on the front of a tractor, wherein the tractor connection mechanism comprises a connection plate, a top hook extending rearwardly from the connection plate, and a bracket engagement member extending rearwardly from the connection plate, wherein the top hook is configured to hook onto the upwardly extending protrusion of the bracket and wherein the bracket engagement member is configured to engage a bottom of the bracket, and further comprising a bracket plate releasably connectable to the bracket engaging member.

In another aspect of the invention, a method of mounting a farm implement onto a tractor, the method comprises providing a tractor having a bracket attached to the front of the tractor, the bracket having a forwardly extending portion and an upwardly extending protrusion; providing a mounting system having a connector plate with a rearwardly extending top hook and a rearwardly extending bracket engagement member, the bracket engagement member being releasably connectable to a bracket plate; inserting the bracket plate between the bracket and the tractor; hooking the top hook onto the upwardly extending protrusion of the bracket; connecting the bracket engagement member to the bracket plate; and connecting the mounting system to a farm implement.

In another aspect of the invention, a method of mounting a farm implement onto a tractor, the method comprises providing a tractor having a bracket attached to the front of the tractor, the bracket having a forwardly extending portion and an upwardly extending protrusion; providing a mounting system having a connector plate with a rearwardly extending top hook and a rearwardly extending bracket engagement member, the bracket engagement member being releasably connectable to a bracket plate; inserting the bracket plate between the bracket and the tractor; hooking the top hook onto the upwardly extending protrusion of the bracket; connecting the bracket engagement member to the bracket plate; connecting the mounting system to a farm implement; disconnecting the mounting system from the tractor; utilizing the bracket; and reconnecting the mounting system to the tractor without removing the bracket.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

DESCRIPTION

The present invention relates to a farm implement tractor mounting system. In particular, the invention relates to a system for mounting a farm implement to the front of a tractor in a manner that the farm implement can be adjusted. Although the invention is illustrated and described in the context of being useful for height adjustment of the farm implement, the present invention can be used in other ways, as would be readily apparent to those of ordinary skill in the art. Accordingly, the present invention should not be limited just to the examples and embodiments described herein.

Figure 1A:
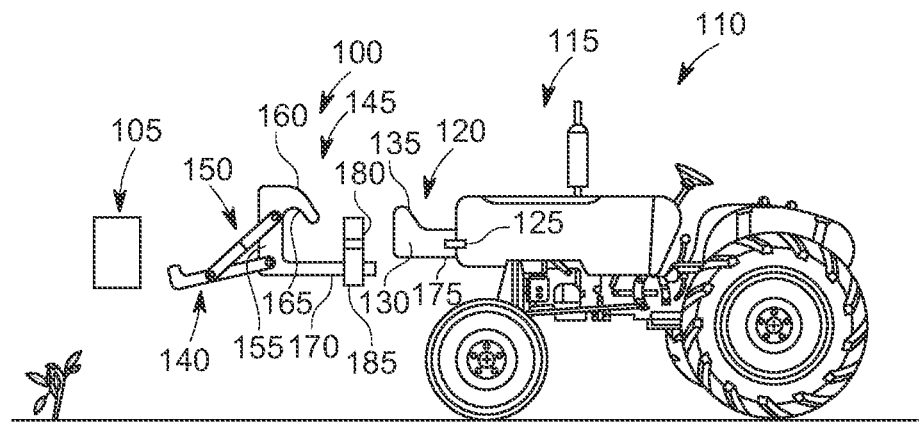
FIG. 1A is a schematic side view of a front tractor mount system of the invention.

As shown in FIG. 1A, a farm implement tractor mounting system 100 is adapted to mount a farm implement 105 to a tractor 110 at the front 115 of the tractor 110. The tractor 110 includes a bracket 120 attached to the front 115 of the tractor 110 by a releasable connection mechanism 125, such as a bolt or the like. The bracket 120 is a rigid member that includes a forwardly extending portion 130 and an upwardly extending protrusion 135 at the forward end of the forwardly extending portion 130. The bracket 120 is attached to the front 115 of the tractor 110 in a manner that allows one or more objects to be connected to the bracket 120. For example, the bracket 120 can be a weight bracket from which weights can be hung from the bracket by hooking onto the upwardly extending protrusion 135.

The farm implement 105 can be any tool or device can be mounted to the front 115 of the tractor 110 and is useful during farming or agricultural operations or otherwise useful as a tractor attachment. For example, in one version, the farm implement can a weed electrocution system, such as the weed electrocution device disclosed in U.S. patent application Ser. No. 15/978,495 which is incorporated herein by reference in its entirety. Other examples of farm implements that can be used include but are not limited to a bale spear for carrying hay, a rock box, a row crop cultivator, a suitcase weight carrying basket, a small tine weeder, a rotary hoe, a weed wiper, a pallet fork frame, and the like.

The tractor mounting system 100 includes a farm implement attachment member 140 at its forward end and a tractor connecting system 145 at its rearward end. The farm implement attachment member is releasably attachable onto the farm implement 105 in a manner where the farm implement 105 can be manipulated by the farm implement attachment member 140. The front tractor mounting system 100 can further include a height adjustment mechanism 150 that allows the height and/or angle of the farm implement 105 to be adjusted, as will be discussed.

The tractor connecting system 145 is latchable onto the bracket 130 to thereby attach the front tractor mounting system 100 to the front 115 of the tractor 110. The tractor connecting system 145 includes a central connection plate 155. A top hook 160 extends rearwardly from the connection plate 155. The top hook 160 includes recess 165 that is sized and shaped to receive the protrusion 135 of the bracket 130. Also extending rearwardly from the connection plate 155 is a bracket engagement member 170 that is sized, size, shaped, and adapted to engage the bottom 175 of the bracket 130. The bracket engagement member 170 is releasably connectable to a bracket plate 180 by a releasable connection mechanism 185, such as a bolt or the like. The bracket plate 180 is positionable between the bracket 130 and the tractor 110 in a manner where the bracket plate 180 is sandwiched between bracket 130 the front 115 of the tractor 110.

Figure 1B:
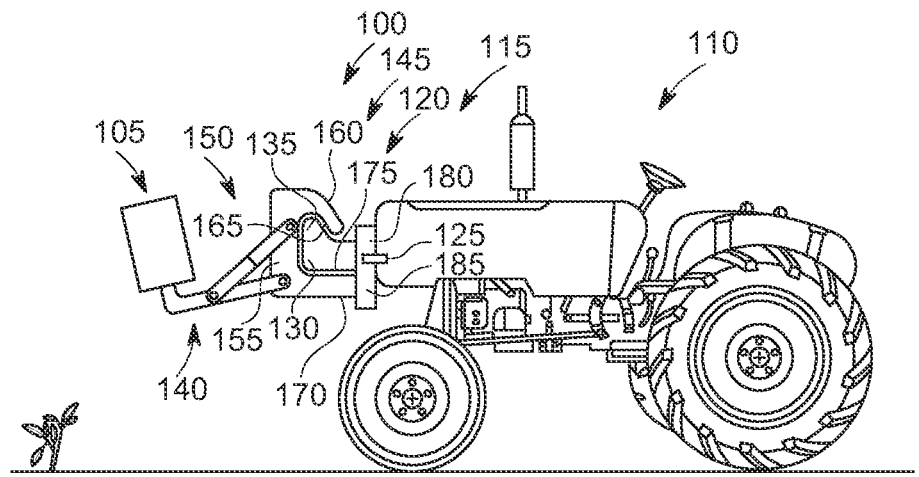
FIG. 1B is a schematic side view of the front tractor mount system of FIG. 1A mounted on a tractor.

FIG. 1B shows the front tractor mounting system 100 mounted onto the tractor 110. To mount the front tractor mounting system 100 onto the tractor the bracket 120 is removed from the front 115 of the tractor 110 by disconnecting it by the releasable connection mechanism 125 and the bracket engagement member 170 is disconnected from the bracket plate 180 by disconnecting the releasable connection mechanism 185. The bracket plate 180 is then inserted between the front 115 of the tractor 110 and the bracket 120 and the bracket 120 is reattached to the front 115 of the tractor 110 by the releasable connection mechanism in a manner that sandwiches the bracket plate 180 between the bracket 120 and the front 115 of the tractor 110. Alternatively, instead of removing the bracket 120 entirely from the tractor 110, the bracket 120 can be loosened enough so that the bracket plate 180 can be inserted between the bracket 120 and the tractor 110. The top hook 160 is then hooked over the upwardly extending protrusion 135 of the bracket 120 so that the upwardly extending protrusion 135 is received in recess 165. The bracket engagement member 170 is then reconnected to the bracket plate 180 by releasable connection mechanism 185 and adjusted so that the bracket engagement member 170 contacts the bottom 175 of the bracket 120. The front tractor mounting system 100 is thereby latched onto the tractor and can be used to attach a farm implement 105.

The front tractor mounting system 100 of the present invention is advantageous over prior front tractor mounts.

Figure 1C:
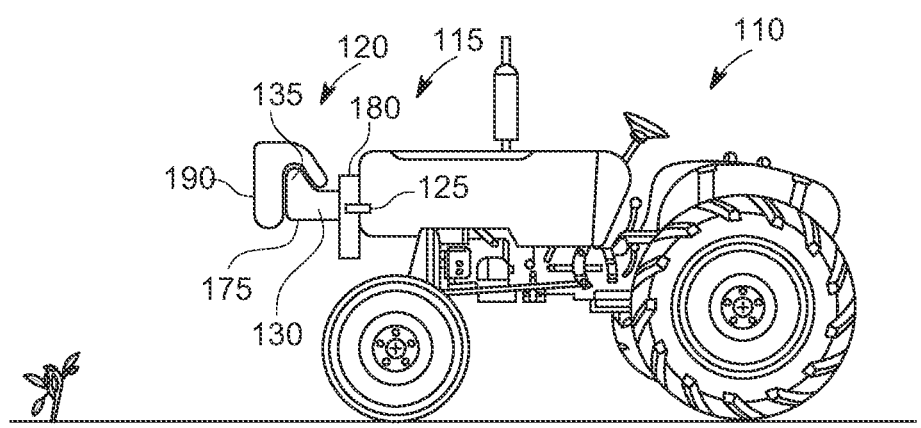
FIG. 1C is a schematic side view of the front tractor mount system of FIG. 1A removed from the tractor.

With prior systems, in order to attach a farm implement 105 to the front of a tractor 110, items on the front of the tractor 110, such as the bracket 120 would have to be removed and remain unattached to the tractor 110 while the farm implement 105 is attached to the tractor. This was a very inconvenient and time consuming process, especially when a user wanted to go back and forth between using the farm implement 105 and using the bracket 120 for another purpose. With the present invention, the bracket 120 can remain attached to the tractor while the farm implement 105 is attached to the tractor 110, as shown in FIG. 1B. Then, when the bracket 120 is to be separately used, a user merely needs to unlatch the front tractor mounting system 100 from the bracket 120, as shown in FIG. 1C and another item, such as a weight 190, can be used with the bracket 120. The bracket plate 180 can remain in place and can be used to easily reattach the front tractor mounting system 100 again. Additionally, by latching onto the bracket 120, the front tractor mounting system 100 offers an easy and secure connection of the farm implement 105 to the tractor 110.

Figure 2:
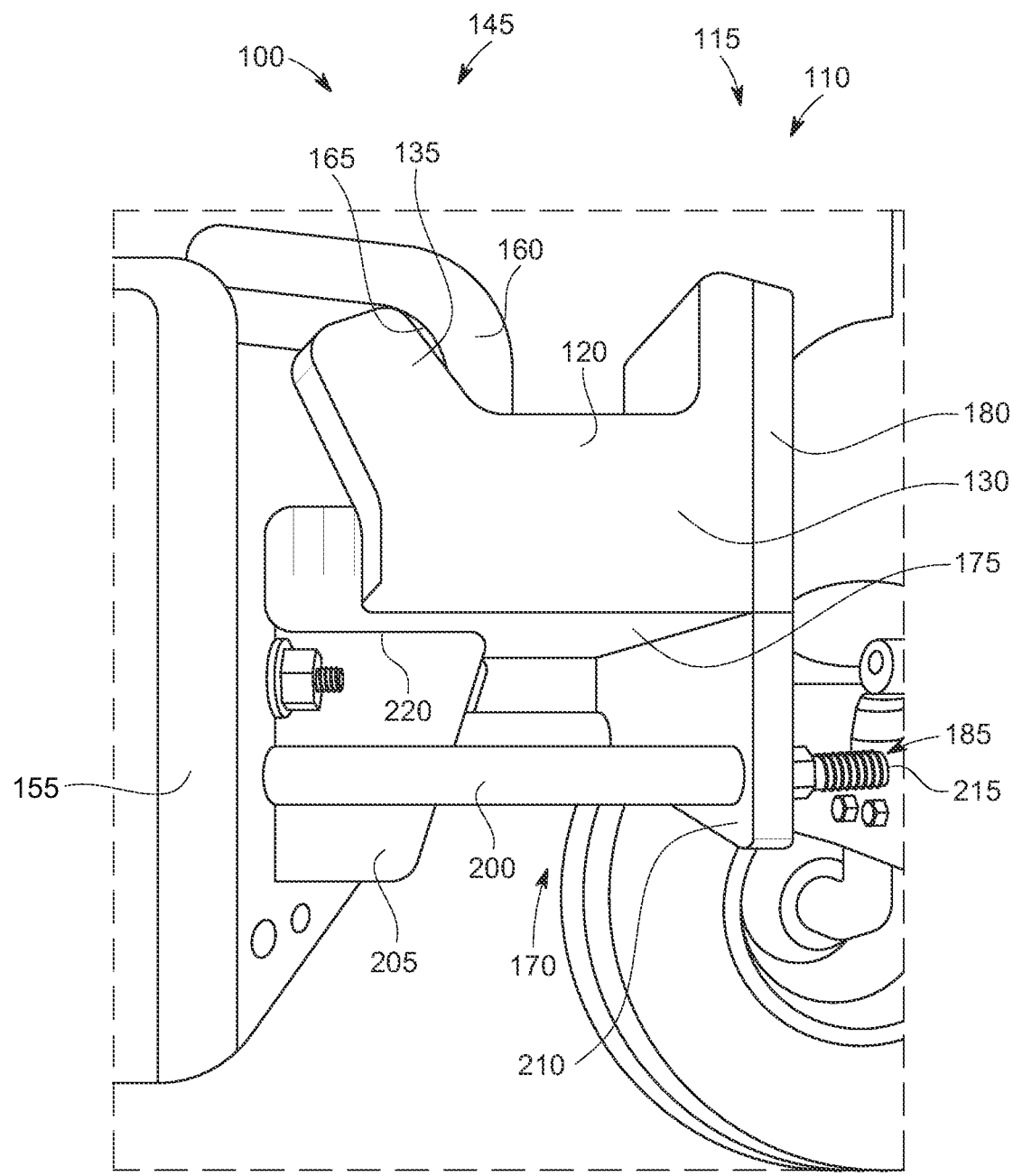
FIG. 2 is a schematic perspective side view of a version of a front tractor mount system mounted on a tractor.

FIG. 2 shows a close up depiction of a version of a tractor connecting system 145 of the front tractor mounting system 100 when latched onto the bracket in a connected configuration. As also shown in FIG. 2, in this version the bracket engagement member 170 is made up of bar 200 and a bracket stop 205. The bar 200 is extendable through a hole 210 in the bracket plate 180 and is securable within the hole by a bolt 215 to make up the releasable connection mechanism 185. The bracket stop 205 has a top surface 220 that can contact the bottom 175 of the bracket 120 when properly positioned. In one version, the bracket stop 205 is connected to the connection plate 155 in a manner where it can be slightly moved, such as by bolts passing through elongated slots, so the fit can be adjusted.

Figure 3:
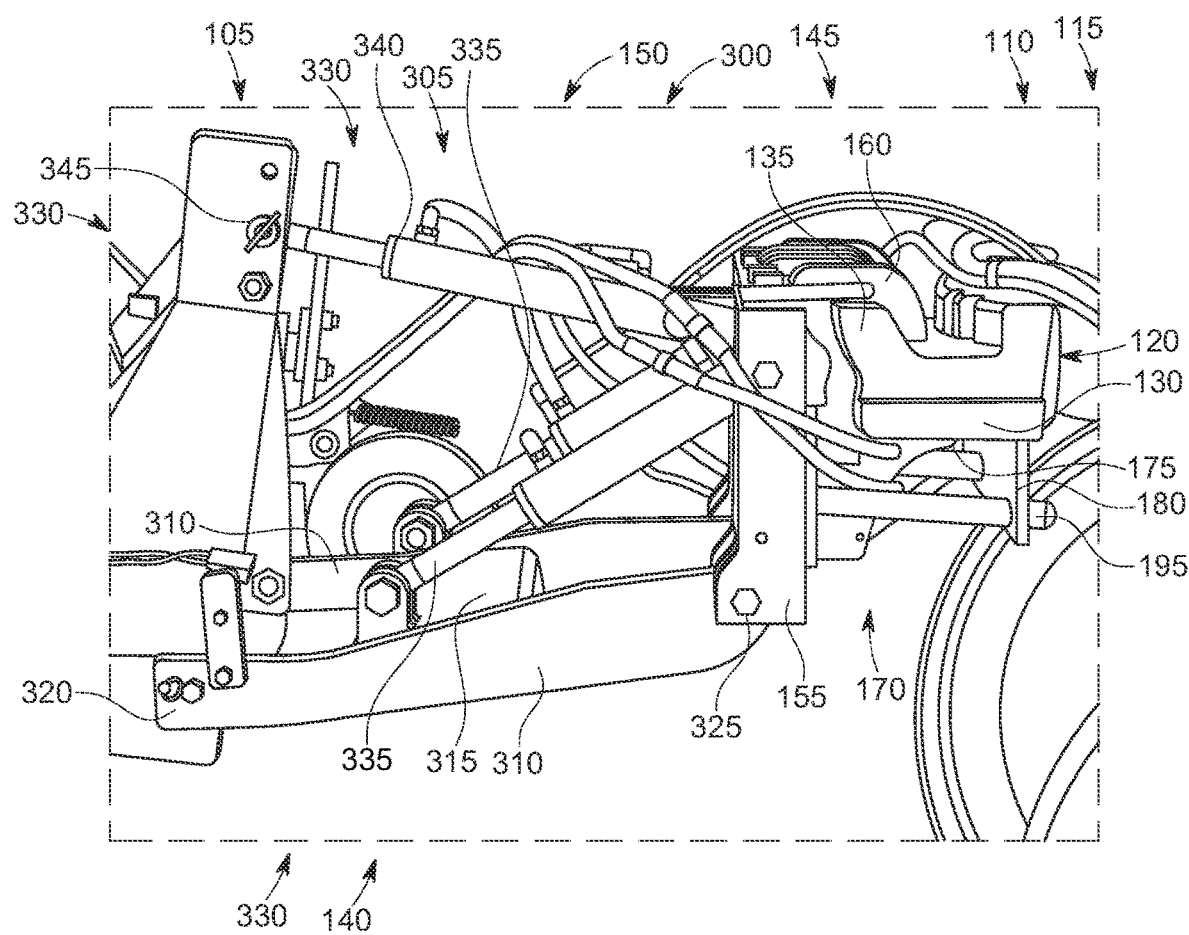
FIG. 3 is a schematic side view of a version of a front tractor mount system mounted to a tractor and to a farm implement.

FIG. 3 shows a particular version of the front tractor mounting system 100 connected to both a tractor 110 at one end and to a farm implement 105 at the other. FIG. 3 also shows details of a height adjusting mechanism 150 according to one version of the invention. In this version, the height adjusting mechanism 150 comprises a three-point hitch 300 that includes a hydraulic system 305 that allows the height and angle of the farm implement 105 to be adjusted. Two outside hydraulic cylinders are pivotally attached at one end to the connector plate 155 and pivotally attached at another end to arms that connect to the farm implement 105. A central hydraulic cylinder is pivotally attached at one end to the connector plate 155 and is pivotally attachable directly to the farm implement 105 at another end. Extension and retraction of the hydraulic cylinders can adjust the height and/or angle of the farm implement 105. The farm implement attachment member 140 includes a pair of forwardly extending arms 310 that are connected to one another by a cross member 315. At the forward end of each of the arms 310 is a connection mechanism, such as a hooking mechanism 320, for connecting or hooking the arm onto the farm implement 105. The arms 310 rotate relative to the connection plate 155 by rotating about a hinge 325.

The hydraulic system 305 includes a plurality of hydraulic cylinders 330 that are each extendable and retractable about a longitudinal axis in a controlled manner. In the version shown a pair of outer hydraulic cylinders 335 are pivotally connected at a rearward end to the connection plate 155 and are pivotally connected at a forward end to the cross member 315. Thus, by extending or retracting, the outer hydraulic cylinders 335 cause the arms 310 to rotate relative to the connection plate 155, thereby raising or lowering the farm implement 105 and/or changing the angle of the farm implement 105. Alternatively, the pair of outer hydraulic cylinders can be replaced by a single cylinder or can be more than two. A central hydraulic cylinder 340 may also be provided. In the version shown, the central hydraulic cylinder 340 has a rearward end pivotally attached to the connection plate 155 and is connectable pivotally directly to the farm implement 105 at its other end, such as by a pivotal joint 345, as shown in FIG. 3.

Figure 4A:
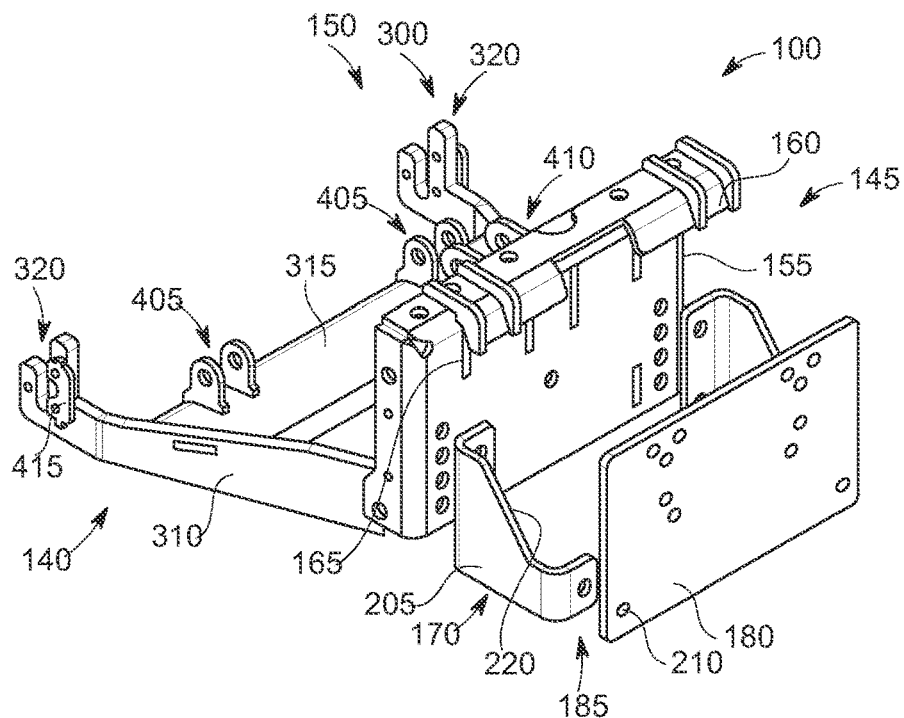
FIG. 4A is a schematic perspective rear view of a version of a front tractor mount of the invention.
Figure 4B:
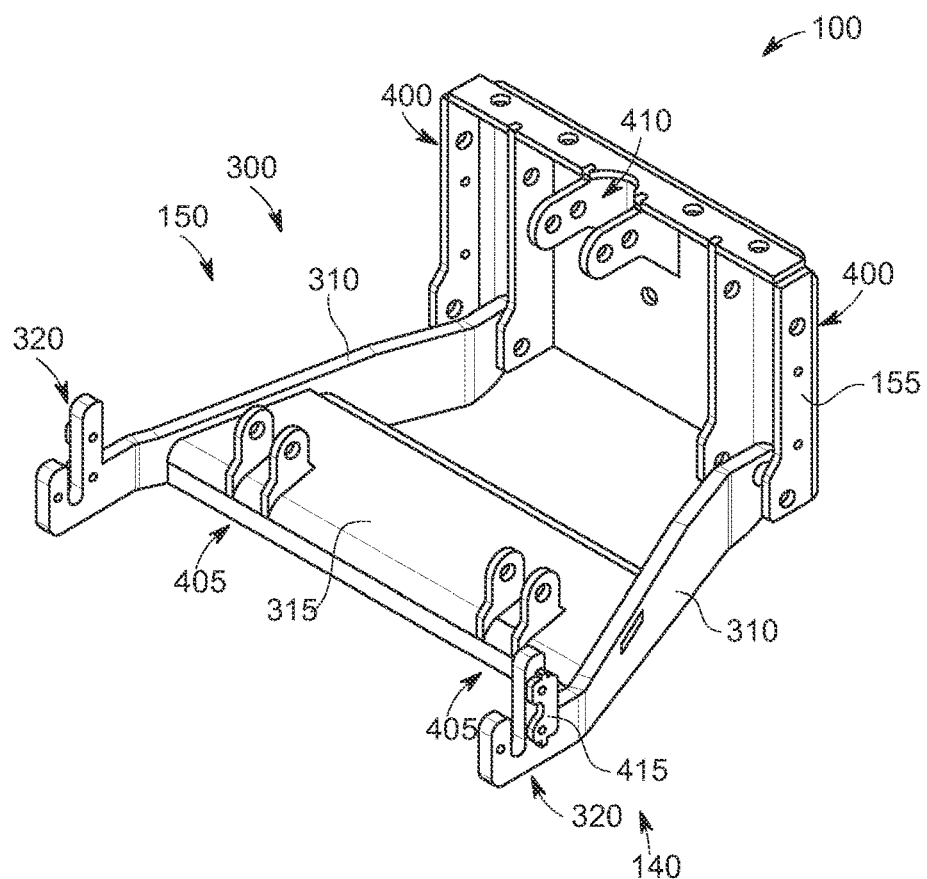
FIG. 4B is a schematic perspective front view of the front tractor mount of FIG. 4A.

FIG. 4A shows a rear perspective view of a particular version of a farm implement tractor mounting system 100 in partially exploded view. FIG. 4B shows a front perspective view of the farm implement attachment member 140 portion of the tractor mounting system 100 of FIG. 4A with the tractor connecting system 145 portion not shown and with the hydraulic cylinders removed for clarity. Also shown in FIGS. 4A and 4B are details of this version. For example, FIG. 4B shows the rearward pivotal joints 400 and the forward pivotal joints 405 for the outer pair of hydraulic cylinder and the rearward pivotal joint 410 for the central hydraulic cylinder. Also, a pawl 415 is shown at the hooking mechanism 320 to help secure the attachment between the arms 310 and the farm implement 105

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number, and all directional limitations, such as up and down and the like, can be switched, reversed, or changed as long as doing so is not prohibited by the language herein with regard to a particular version of the invention. Also, the various features of the versions herein can be combined in various ways to provide additional versions of the present invention. Furthermore, certain terminology has been used for the purposes of descriptive clarity, and not to limit the present invention. Throughout this specification and any claims appended hereto, unless the context makes it clear otherwise, the term "comprise" and its variations such as "comprises" and "comprising" should be understood to imply the inclusion of a stated element, limitation, or step but not the exclusion of any other elements, limitations, or steps. Throughout this specification and any claims appended hereto, unless the context makes it clear otherwise, the term "consisting of" and "consisting essentially of" and their variations such as "consists" should be understood to imply the inclusion of a stated element, limitation, or step and not the exclusion of any other elements, limitations, or steps or any other non-essential elements, limitations, or steps, respectively. Throughout the specification, any discussed on a combination of elements, limitations, or steps should be understood to include a disclosure of additional elements, limitations, or steps and the disclosure of the exclusion of additional elements, limitations, or steps. All numerical values, unless otherwise made clear in the disclosure or prosecution, include either the exact value or approximations in the vicinity of the stated numerical values, such as for example about +/−ten percent or as would be recognized by a person or ordinary skill in the art in the disclosed context. The same is true for the use of the terms such as about, substantially, and the like. Also, for any numerical ranges given, unless otherwise made clear in the disclosure, during prosecution, or by being explicitly set forth in a claim, the ranges include either the exact range or approximations in the vicinity of the values at one or both of the ends of the range. When multiple ranges are provided, the disclosed ranges are intended to include any combinations of ends of the ranges with one another and including zero and infinity as possible ends of the ranges. Therefore, any appended or later filed claims should not be limited to the description of the preferred versions contained herein and should include all such alterations, permutations, and equivalents as fall within the true spirit and scope of the present invention.

What is claimed is:

1. A mounting system for mounting a farm implement to a tractor having a bracket attachable to the front of the tractor, the bracket having a forwardly extending portion and an upwardly extending protrusion, the mounting system comprising:
   a farm implement attachment member comprising one or more arms with a connection mechanism adapted to connect to a farm implement;
   a height adjusting mechanism adapted to adjust the height of the farm implement when connected to the one or more arms of the farm implement attachment member;
   a bracket plate adapted to be installed on the tractor so that it is sandwiched between the bracket and the front of the tractor; and
   a tractor connection mechanism adapted to mount the farm implement attachment member to the front of a tractor, wherein the tractor connection mechanism comprises a connection plate, a top hook extending rearwardly from the connection plate, and a bracket engagement member extending rearwardly from the connection plate, wherein the top hook is configured to hook onto the upwardly extending protrusion of the bracket, wherein the bracket engagement member is configured to engage a bottom of the bracket; and wherein the bracket engagement member is directly releasably connectable to the bracket plate when the bracket plate is sandwiched between the bracket and the front of the tractor.

2. The mounting system according to claim 1, wherein the tractor connection mechanism is configured to be unmounted from the tractor without removing the bracket from the tractor.

3. The mounting system according to claim 1, wherein the height adjusting mechanism comprises a hydraulic system.

4. The mounting system according to claim 3, wherein the hydraulic system comprises one or more hydraulic cylinders that are extendable and retractable to cause the one or more arms to rotate relative to the connection plate.

5. The mounting system according to claim 4, wherein the hydraulic system further comprises a hydraulic cylinder adapted to be connected directly to the farm implement.

6. The mounting system according to claim 1, wherein the tractor connection mechanism is configured to be unmounted from the tractor without removing the bracket and the bracket plate from the tractor.

7. The mounting system according to claim 1, wherein the tractor connection mechanism is configured to be unmounted from the tractor without removing the bracket and the bracket plate from the tractor and wherein one or more weights are configured to be hung from the bracket while the bracket and bracket plate are attached to the tractor.

8. A method of mounting a farm implement onto a tractor, the method comprising:
   providing a tractor having a bracket attachable to the front of the tractor, the bracket having a forwardly extending portion and an upwardly extending protrusion;
   providing a mounting system having a connection plate with a rearwardly extending top hook and a rearwardly extending bracket engagement member and a bracket plate;
   sandwiching the bracket plate between the bracket and the front of the tractor;
   hooking the top hook onto the upwardly extending protrusion of the bracket;
   connecting the bracket engagement member directly to the bracket plate; and
   connecting the mounting system to a farm implement.

9. The method according to claim 8 further comprising:
   disconnecting the mounting system from the tractor;
   utilizing the bracket by installing a weight thereon;
   removing the weight from the bracket; and
   reconnecting the mounting system to the tractor without removing the bracket.

10. A mounting system for mounting a farm implement to a tractor, the mounting system comprising:
    a farm implement attachment member adapted to connect to a farm implement;
    a bracket attachable to the front of the tractor, the bracket having a forwardly extending portion and an upwardly extending protrusion,
    a bracket plate adapted to be installed on the tractor so that it is sandwiched between the bracket and the front of the tractor; and
    a tractor connection mechanism adapted to mount the farm implement attachment member to the front of a tractor, wherein the tractor connection mechanism comprises a connection plate, a top hook extending rearwardly from the connection plate, and a bracket engagement member extending rearwardly from the connection plate, wherein the top hook is configured to hook onto the upwardly extending protrusion of the bracket, wherein the bracket engagement member is configured to engage a bottom of the bracket; and wherein the bracket engagement member is directly releasably connectable to the bracket plate when the bracket plate is sandwiched between the bracket and the front of the tractor.

11. The mounting system according to claim 10, wherein the tractor connection mechanism is configured to be unmounted from the tractor without removing the bracket from the tractor.

12. The mounting system according to claim 10, wherein the tractor connection mechanism is configured to be unmounted from the tractor without removing the bracket and the bracket plate from the tractor.

13. The mounting system according to claim 10, wherein the tractor connection mechanism is configured to be unmounted from the tractor without removing the bracket and the bracket plate from the tractor and wherein one or more weights are configured to be hung from the bracket while the bracket and bracket plate are attached to the tractor.

14. The mounting system according to claim 10, wherein the farm implement attachment mechanism comprises one or more arms with a connection mechanism.

15. The mounting system according to claim 10, further comprising a height adjusting mechanism adapted to adjust the height of the farm implement when connected to the farm implement attachment member.

16. The mounting system according to claim 10, further comprising a height adjusting mechanism adapted to adjust the height of the farm implement when connected to the farm implement attachment member, wherein the height adjusting mechanism comprises a hydraulic system.

\* \* \* \* \*